United States Patent [19]

Nyboer

[11] Patent Number: 4,513,530
[45] Date of Patent: Apr. 30, 1985

[54] MACHINE FOR LAYING FILM MATERIAL

[75] Inventor: Duane A. Nyboer, Hamilton, Mich.

[73] Assignee: Mechanical Transplanter Company, Holland, Mich.

[21] Appl. No.: 507,291

[22] Filed: Jun. 22, 1983

[51] Int. Cl.³ ............................................... A01G 7/00
[52] U.S. Cl. ......................................................... 47/9
[58] Field of Search ...................................... 111/1-3; 172/701; 47/9, 56

[56] References Cited

U.S. PATENT DOCUMENTS

| | | | |
|---|---|---|---|
| 3,176,635 | 4/1965 | Mabon | 111/3 |
| 3,315,623 | 4/1967 | Tschudy | 47/9 X |
| 3,353,297 | 11/1967 | Gervais | 47/9 X |
| 3,468,267 | 9/1969 | Morris et al. | 111/73 |
| 3,905,313 | 9/1975 | Grether | 111/1 |
| 4,285,161 | 8/1981 | Kawasaki et al. | 172/701 X |

*Primary Examiner*—Richard T. Stouffer
*Assistant Examiner*—Danton D. DeMille
*Attorney, Agent, or Firm*—Glenn B. Morse

[57] ABSTRACT

The machine is coupled to a standard tractor, and normally slides over the ground on a skid plate as the vehicle moves forward. A film roll is supported on the machine in a position to be unwound, and the film is progressively deposited on the ground behind the skid plate. Groove-forming structure under the skid plate are disposed centrally inward from the edges of the film roll, and following wheels depress the edges of the film into the groove. Scraper plates then move earth into the grooves, entrapping the edges of the film.

1 Claim, 7 Drawing Figures

MACHINE FOR LAYING FILM MATERIAL

BACKGROUND OF THE INVENTION

A relatively recent development in agriculture involves the spreading of thin transparent or translucent film directly upon the ground, followed by planting with equipment that pokes the seedlings through the film. This procedure has been shown to have a number of advantages, notably a greater retention of moisture in the ground, suppression of weed growth, increased warmth from the greenhouse effect, and reduction of wind erosion. Specialized machines have been adapted to carry a roll of the film material, which is permitted to unwind as the machine is moved along with a standard tractor. Provision must obviously be made to secure at least the edges of the film as it is unrolled, in order to hold it in place against wind action. This has commonly been done by forming grooves in the ground, and depressing the edges of the film into the grooves. Scraping blades then close the furrows behind the machine, thus locking the film more or less securely in position. The effectiveness of this technique has focused considerable attention on the development of more convenient and cost-efficient machines for laying film material. The present invention provides a machine utilizing these principles, and having structural characteristics resulting in compactness and reduced cost of manufacture.

SUMMARY OF THE INVENTION

The machine is adapted to be pulled across the ground in the manner of a sled. A coupling system is adapted to a standard tractor hitch assembly, which permits the machine to be raised to inactive position, and then lowered to slide along the ground as the tractor moves forward. Groove-forming devices are mounted on the underside of the skid plate, and a support bracket for the film roll is positioned so that the film can be unwound over the trailing edge of the skid plate. A cantilever assembly extending to the rear along both sides of the skid plate provides a frame for supporting an axle assembly carrying wheels in front-rear alignment with the groove-forming devices, so that the film is depressed downward into the grooves as the machine proceeds. The frame on the machine also provides support for scraper plates behind the wheels positioned to move earth over to fill the grooves and entrap the edges of the film. A pressure roll is interposed between the wheels and the film-storage roll to lay the film solidly against the ground prior to the engagement of the wheels. Preferably, both the pressure roll and the film-depressing wheels are mounted for vertical movement, with the latter being biased downwardly by spring action.

DESCRIPTION OF THE PREFERRED EMBODIMENT

Figure 1:
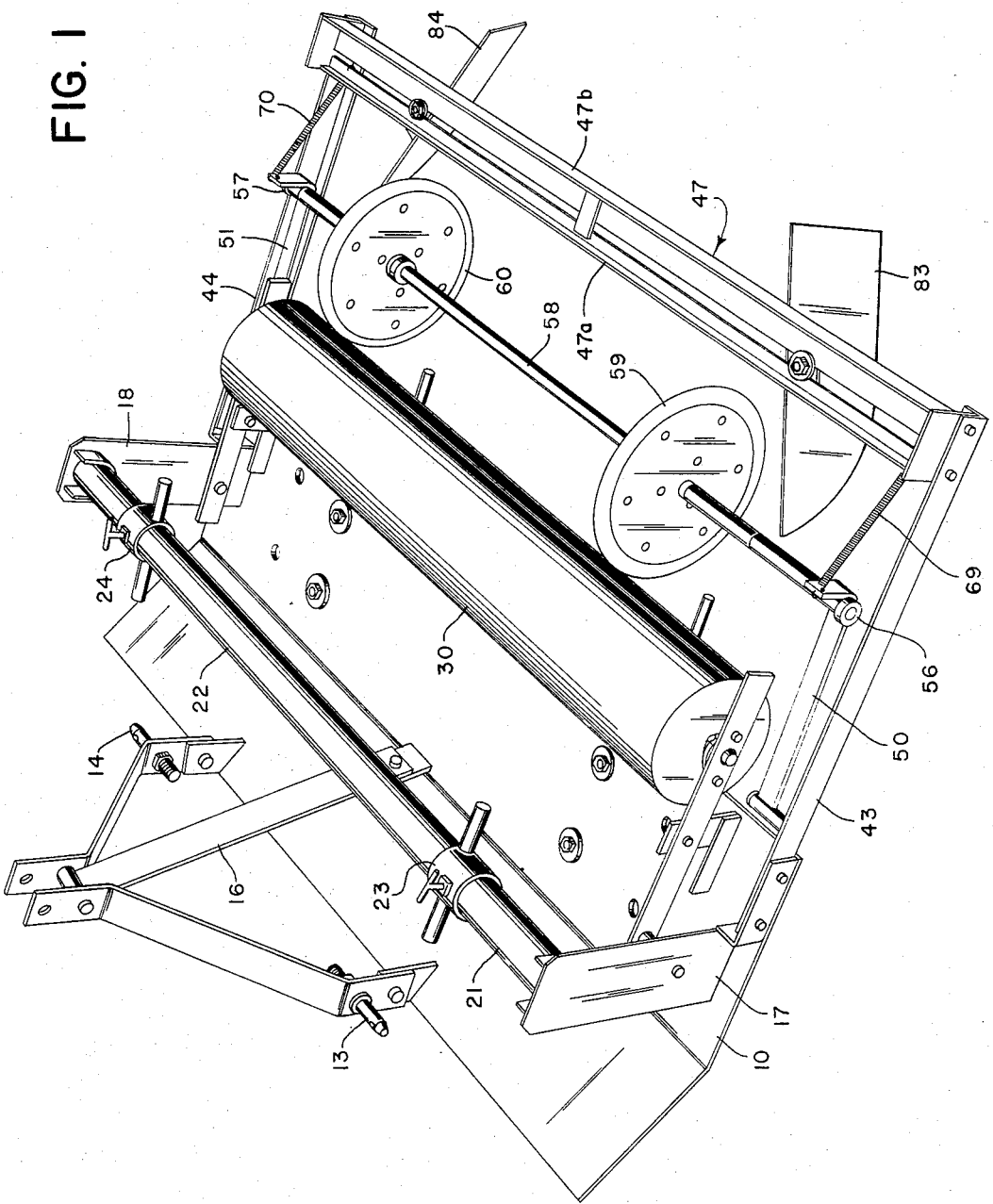
FIG. 1 is a perspective view of the machine.

Referring to the drawings, the skid plate 10 has an upwardly-inclined front portion 11 providing a configuration similar to a ski or toboggan. A coupling structure 12 at the front extremity of the skid plate provides for the laterally-spaced connecting points 13-14, and for a central and somewhat elevated connecting point at 15. These points are positioned to receive the standard equipment on tractors for handling various implements. A diagonal brace 16 stabilizes the structure 12 to resist the forces involved. These members can either be welded directly to the skid plate 11, or bolted to tabs (as shown) that are welded in position.

A pair of roll brackets 17-18 are positioned on a transverse axis in opposite relationship, and are welded at the lower extremities to the skid plate 10. Each of these brackets is provided with a U-shaped receptacle as shown at 19 and 20 for receiving the tube 21 carrying the roll of film indicated at 22. The tube is thus easily removeable for the installation of film rolls. Locating collars as shown at 23 and 24 are slideably received on the tube 21, and are secured in place by T-headed screws 25 and 26 so that the radial pins 27a-b and 28a-b can engage the ends of the roll 22 for confinement against axial movement. The film sheet, as it pulls free of the roll, is indicated in the drawings at 29.

As the film sheet 29 pays out past the rear edge of the skid plate 10, it encounters the pressure roller 30, which presses it down firmly against the ground. Normally, the cultivated condition of the ground will leave it somewhat porous, the initial ground level being indicated at 31 in FIG. 2. As the pressure roller 30 becomes effective, however, the ground becomes compacted slightly under the film as the film is deposited. This new ground level is indicated at 32. The pressure roller 30 is mounted with a limited degree of vertical movement, as a result of being carried by the laterally-spaced arms 33-34, which are respectively pivotally connected to the roll brackets 17 and 18 as shown at 35 and 36. The roller 30 is rotatable in the bearings 33a and 34a secured respectively to the arms 33 and 34. The weight of the pressure roller will generate its own biasing action to produce the differential in ground level shown in FIG. 2. In FIG. 3, the machine is shown in a preliminary condition, which permits the film sheet to be threaded underneath the pressure roller, and the machine is usually placed temporarily on a concrete surface for this purpose so that rests on the lower edge of the groove-forming devices 37 and 38. To support the pressure roll 30 temporarily in the absence of ground pressure, the L-shaped supports as shown at 39 in FIG. 2 can be swung from the FIG. 2 position to the position appearing in FIG. 3. These supports are pivotally connected to the arms 33 and 34 as shown at 40 in FIG. 2, and are rotated counterclockwise from the FIG. 2 to the FIG. 3 position. When the need to maintain the pressure roll 30 in an elevated position is no longer present, the moveable supports 39 are rotated back to the FIG. 2 position.

Figure 2:
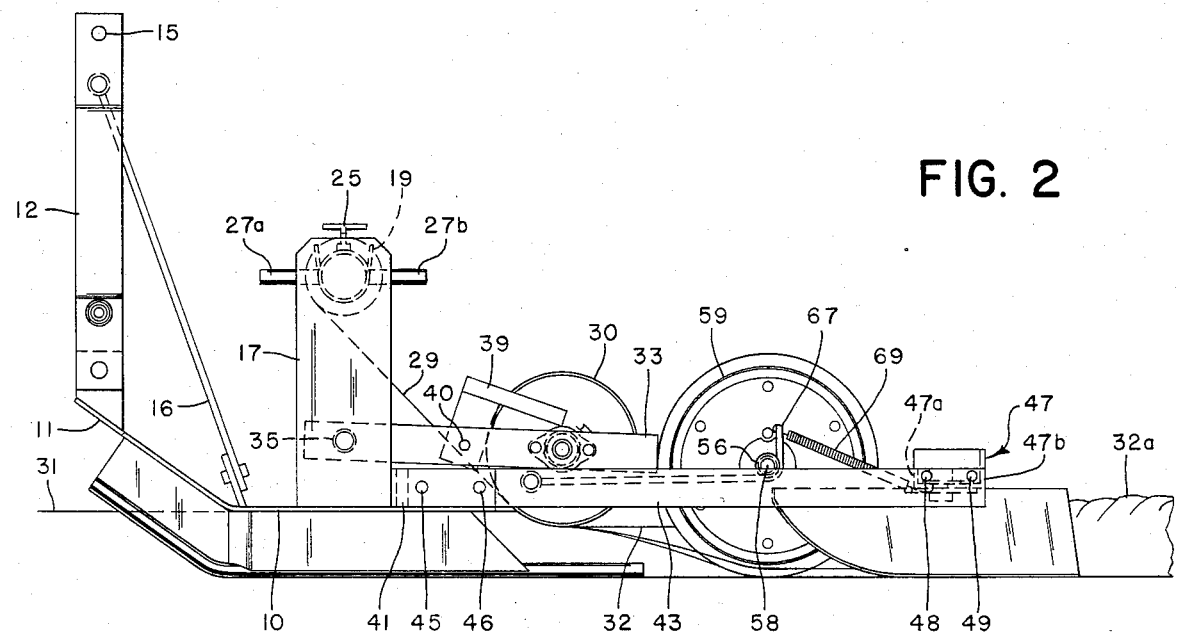
FIG. 2 is a side elevation of the machine in operating position.
Figure 3:
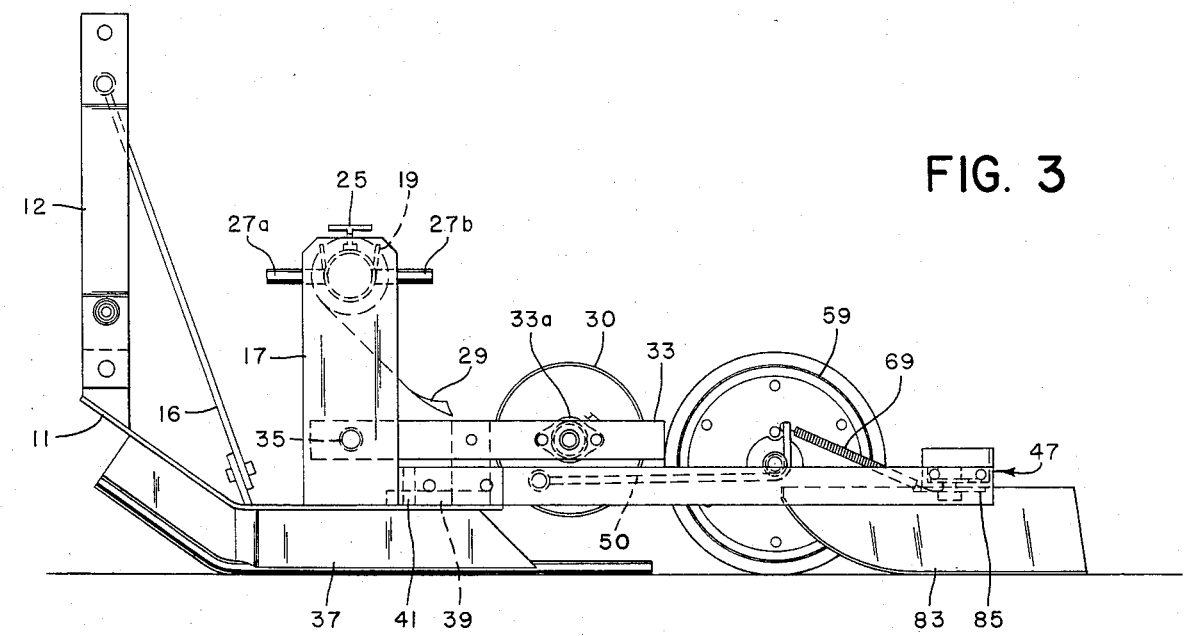
FIG. 3 is a side elevation of the machine in a preliminary position, supported temporarily on the bottom of the groove-forming means so that the film can be properly threaded underneath the pressure roller prior to beginning the deposition of the film.

A pair of angular members shown at 41 and 42 are welded along their bottom edges to the skid plate 10, and form supports for the rearwardly-extending cantilever arms 43 and 44, which are bolted to the angle members as shown at 45 and 46 in FIG. 2. The opposite ends of a cross member 47 are bolted to the arms 43 and 44 as shown at 48 and 49, so that the resulting U-shaped structure forms a cantilever frame extending to the rear of the skid plate 10. A pair of links shown at 50 and 51 are pivotally connected to the arms 43 and 44 at 52 and 53, respectively, and the rear extremity of these links carries a short tubular sleeve 54 and 55 welded to the links. End collars as shown at 56 and 57 surround the ends of the shaft 58, which carry the film-depressing wheels 59 and 60, with the wheels free to rotate on the shaft. Locating collars as shown at 61 and 62 limit the movement of the wheels in a central direction, and the removeable spacing tubes 63–66 may be used in determining the correct front-rear alignment of the wheels with the groove-forming devices 37 and 38. The rear ends of the links 50 and 51 are turned upwardly as shown at 67 and 68 to form terminals for the tension springs 69 and 70 which extend from these points to the cross member 47.

Figure 4:
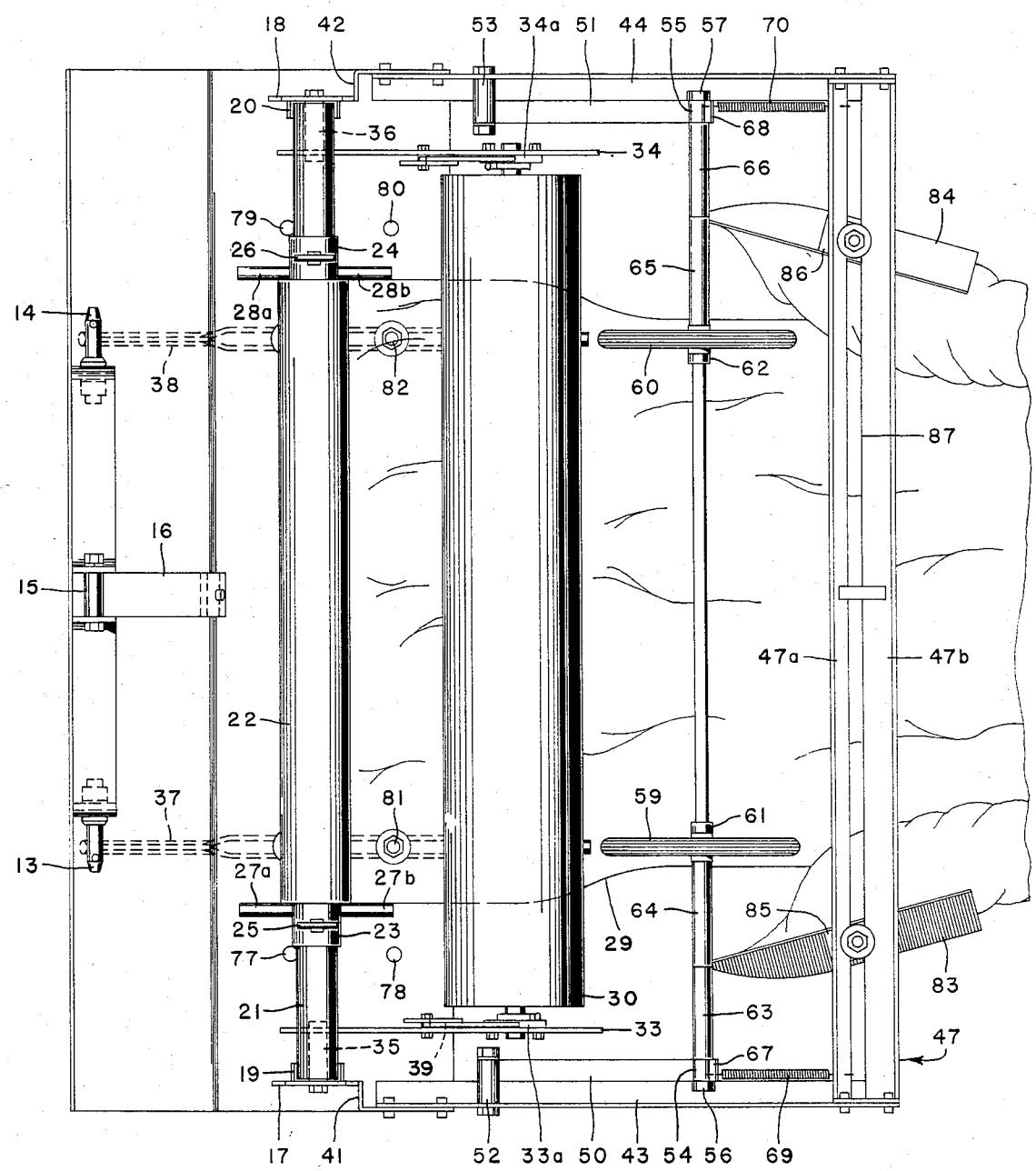
FIG. 4 is a plan view of the machine.
Figure 5:
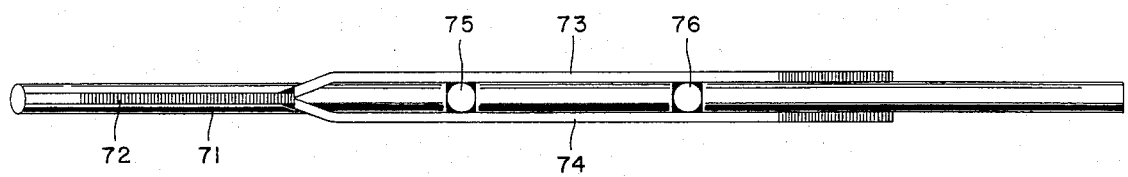
FIG. 5 is a top view on an enlarged scale showing one of the groove-forming devices.
Figure 6:
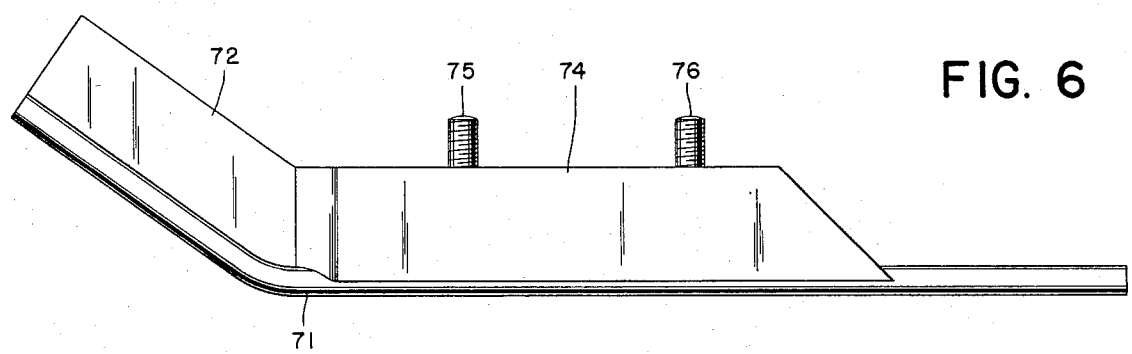
FIG. 6 is a side elevation with respect to FIG. 5.
Figure 7:
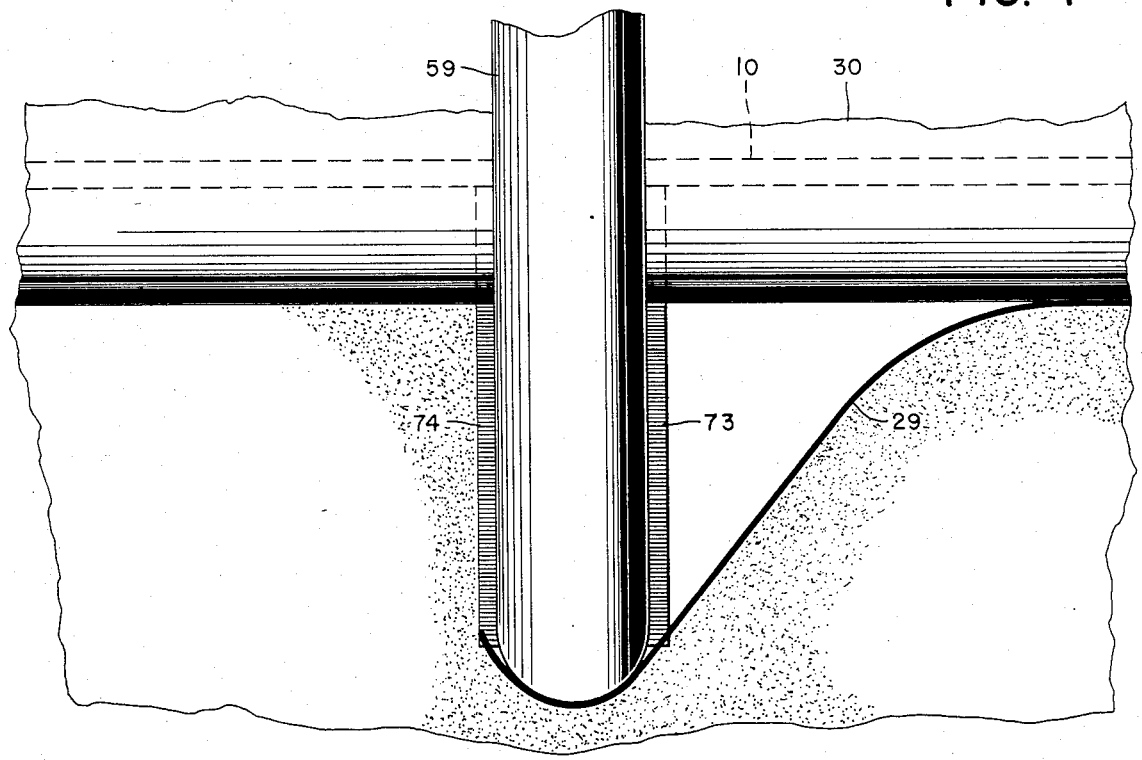
FIG. 7 is a fragmentary section showing the action of the machine in depressing an edge of the film downward into the groove in the earth.

Referring particularly to FIGS. 5 and 6, the groove-forming devices are composite weldments which include a round bar 71 bent upwardly at the front end into parallelism with the forward portion 11 of the skid plate. The central web portion 72 welded to the top of the bar 71 bears against the underside of the inclined portion 11. Spaced parallel side plates 73–74 are separated to admit the lower portions of bolts as shown at 75 and 76, which traverse suitable openings in the skid plate as shown at 77–80 in FIG. 4, where they are engaged by nuts as shown at 81 and 82 and secure the groove-forming devices in position. A plurality of sets of these holes is provided, so that the spacing of the earth grooves can be selected as may be required, accompanied by the proper selection of the spacing tubes 63–66 for corresponding locations of the film-depressing wheels 59 and 60.

The principal function of the transverse rear frame member 47 is to provide support for the scraping blades 83 and 84, which are secured to the cross member 47 by clamp assemblies 85 and 86. The transverse member 47 is formed of two pieces 47a and 47b having an angular cross section, and separated by a slot 87 for receiving the clamping assemblies with freedom for lateral adjustment. These are properly located by experiment so that the scraped earth is deflected into the groove formed by the devices 37 and 38, and into which the film 29 has been depressed by the wheels 59 and 60. This final action secures the film in its installed position. The action of these scraper blades normally leaves a ridge of earth as shown at 32a in FIG. 2.

I claim:

1. A machine for laying film material on the ground for agricultural purposes, comprising:
   a skid plate having coupling means adapted to associate said machine with a vehicle;
   a pair of laterally-spaced film roll brackets mounted on said skid plate; roll-support means engageable with said brackets;
   a pair of laterally-spaced arms pivotally mounted on said roll brackets, respectively, and a pressure roller rotatably mounted at the opposite ends thereof on said arms, respectively;
   laterally-spaced groove-forming means mounted on the underside of said skid plate;
   scraper plates mounted on structure fixed with respect to said skid plate and disposed to scrape earth into the groove formed by at least certain of said groove-forming means;
   a frame secured to said skid plate and having laterally spaced cantilever sides; a pair of trailing links pivotally attached to said frame sides, respectively;
   an axle secured at its opposite ends, respectively, to said links;
   wheels constituting film-depressing members rotatably mounted on said axle in rearward alignment with said groove-forming means, respectively;
   a cross-member of said frame secured to said frame side members at the opposite ends thereof from said skid plate, said scraper plates being mounted on said cross-member; and
   biasing means extending from said trailing links to said cross-member urging said wheels downward.

* * * * *